(12) United States Patent
Yang et al.

(10) Patent No.: US 7,004,741 B2
(45) Date of Patent: Feb. 28, 2006

(54) RUBBER EXTRUDER

(75) Inventors: Chih-Hao Yang, Atherton, CA (US);
Hsueh-Cheng Liao, Chang-Hua (TW)

(73) Assignee: Multiple Corporation, Nan-Tou Hsien (TW)

( * ) Notice: Subject to any disclaimer, the term of this patent is extended or adjusted under 35 U.S.C. 154(b) by 380 days.

(21) Appl. No.: 10/347,232

(22) Filed: Jan. 21, 2003

(65) Prior Publication Data

US 2005/0100624 A1    May 12, 2005

(51) Int. Cl.
*B29C 45/53* (2006.01)
(52) U.S. Cl. .................... 425/145; 425/560; 425/583; 425/558
(58) Field of Classification Search ................ 425/557, 425/558, 559, 560, 561, 145, 583; 264/323
See application file for complete search history.

(56) References Cited

U.S. PATENT DOCUMENTS

| | | | | |
|---|---|---|---|---|
| 5,863,567 A | * | 1/1999 | Klaus | 425/145 |
| 6,086,353 A | * | 7/2000 | Klaus | 425/145 |
| 6,443,722 B1 | * | 9/2002 | Castelli et al. | 425/145 |
| 6,461,142 B1 | * | 10/2002 | Kadoriku et al. | 425/558 |

* cited by examiner

*Primary Examiner*—Joseph S. Del Sole
(74) *Attorney, Agent, or Firm*—Berenato, White & Stavish, LLC

(57) ABSTRACT

A rubber extruder includes a barrel, a screw rod extending into the barrel, a threaded member threadedly engaging the screw rod and rotatable relative to the screw rod, a limiting member for limiting rotation of the screw rod upon rotation of the threaded member so as to permit axial movement of the screw rod, and a driving unit for rotating the threaded member.

3 Claims, 5 Drawing Sheets

RUBBER EXTRUDER

BACKGROUND OF THE INVENTION

1. Field of the Invention

This invention relates to a rubber extruder, more particularly to a rubber extruder with a screw rod for extruding a rubber or rubber-like material from the rubber extruder.

2. Description of the Related Art

Conventional rubber extruders (see FIG. 1), such as those disclosed in U.S. Pat. Nos. 5,679,293, 5,486,104, 4,850,839, and 4,565,512, normally include a cylindrical barrel 11 adapted to receive a rubber or rubber-like material therein, and a hydraulic operated ram 121 disposed movably in a hydraulic cylinder 12 and extending into the cylindrical barrel 11 for extruding the rubber material through an extrusion die (not shown). A cutter 13 is disposed downstream of the extrusion die for periodically cutting the resultant extruded material into pieces of extrudate of equal dimensions.

Since the hydraulic operated ram 121 is made from metal, it will be subjected to expansion or contraction as a result of variation of the temperature of hydraulic oil entering into the hydraulic cylinder 12, thereby affecting the advancing speed of the hydraulic operated ram 121. As a consequence, the advancing speed of the extrudate is correspondingly affected, thereby resulting in non-uniform dimensions of the pieces of the extrudate. In addition, the resistance to advancing movement of the hydraulic operated ram 121 is higher when a higher amount of the rubber material is present in the barrel 11. As such, the advancing speed of the hydraulic operated ram 121 will vary along with the variation of the amount of the rubber material present in the barrel 11. Moreover, the hydraulic oil for driving the hydraulic operated ram 121 is required to be periodically replaced with fresh hydraulic oil, and has to be disposed according to the requirements of local environmental regulations.

SUMMARY OF THE INVENTION

Therefore, it is an object of the present invention to provide a rubber extruder with a screw rod that is capable of overcoming the aforementioned drawbacks of the prior art.

According to this invention, there is provided a rubber extruder that comprises: a fixed cylindrical barrel adapted to receive a rubber material and having a die end and an opposite end opposite to the die end; an extrusion die mounted in the die end of the cylindrical barrel; a screw rod having an inner section that extends co-axially through the opposite end of the cylindrical barrel and into the cylindrical barrel and that has an abutting end adapted to abut against the rubber material, and an outer section that extends axially from the inner section and that is disposed outwardly of the cylindrical barrel, the screw rod being movable in an axial direction relative to the cylindrical barrel so as to extrude the rubber material through the extrusion die; a coupling unit including a threaded sleeve that is sleeved rotatably on and that engages threadedly the outer section of the screw rod; a fixed limiting member in constant engagement with the screw rod in such a manner that rotation of the threaded sleeve results in axial movement of the screw rod relative to the cylindrical barrel; and a driving unit for rotating the threaded sleeve.

BRIEF DESCRIPTION OF THE DRAWINGS

In drawings which illustrate an embodiment of the invention.

DETAILED DESCRIPTION OF THE PREFERRED EMBODIMENT

Figure 1:
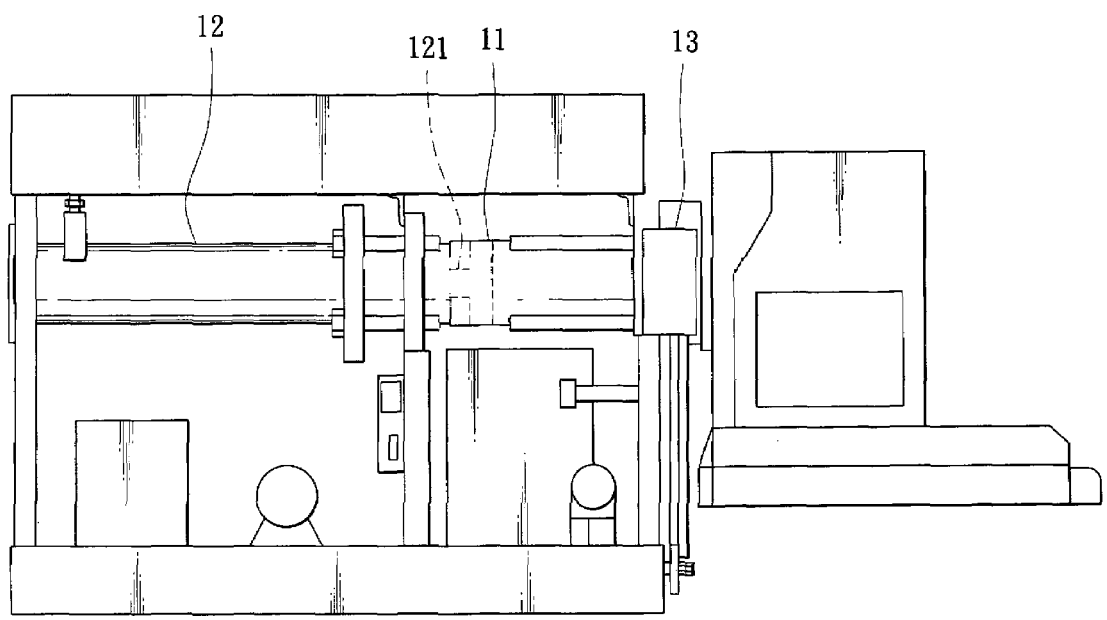
FIG. 1 is a schematic side view of a conventional rubber extruder.
Figure 2:
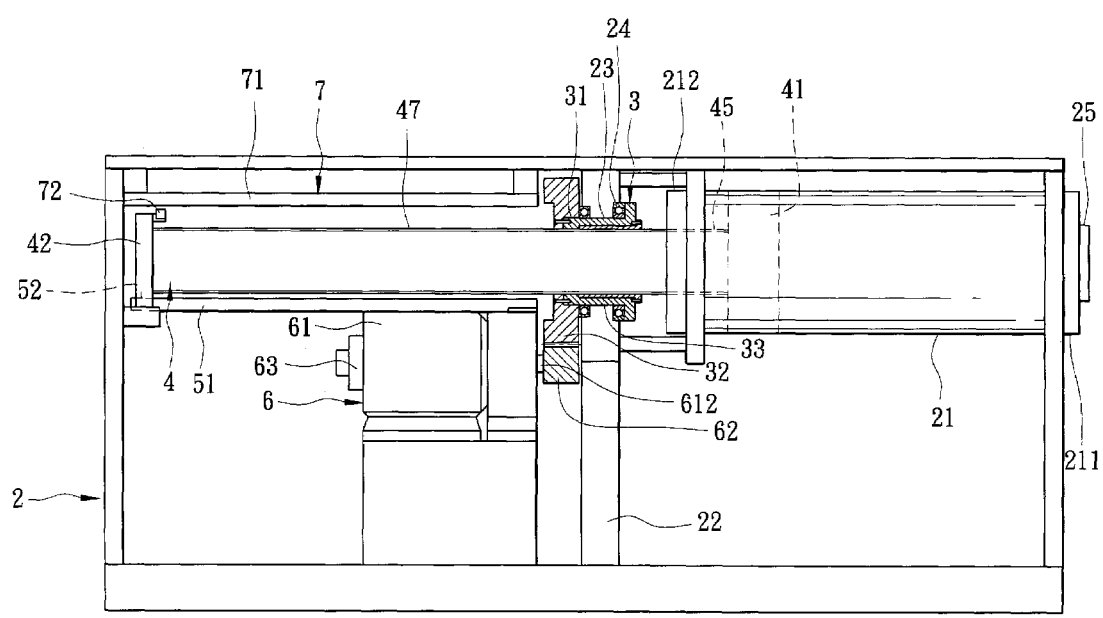
FIG. 2 is a schematic side view of a rubber extruder embodying this invention.
Figure 3:
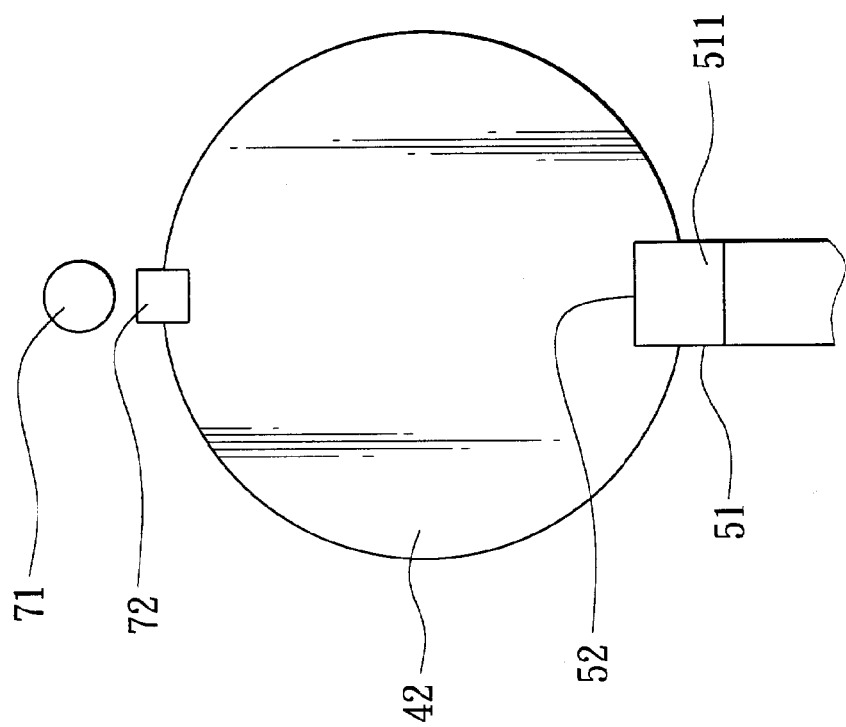
FIG. 3 is a schematic view to illustrate how a distal end of a screw rod is limited by an elongated limiting bar of the rubber extruder of FIG. 2.
Figure 4:
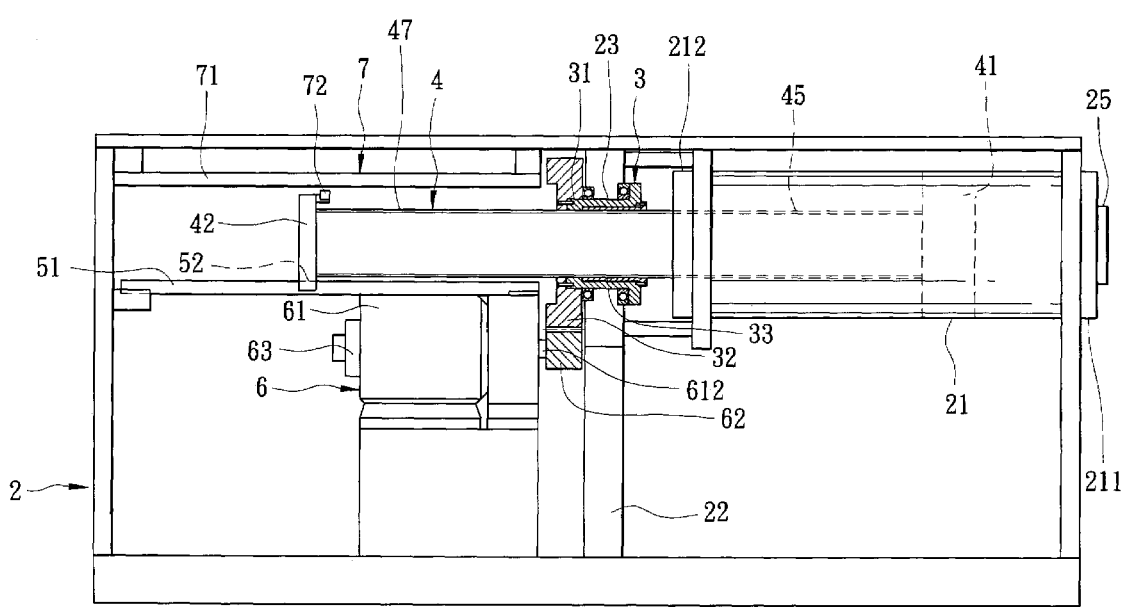
FIG. 4 is a schematic side view of the rubber extruder of FIG. 2, illustrating an abutting end of the screw rod when moved to a position close to an extrusion die of the rubber extruder of FIG. 2.
Figure 5:
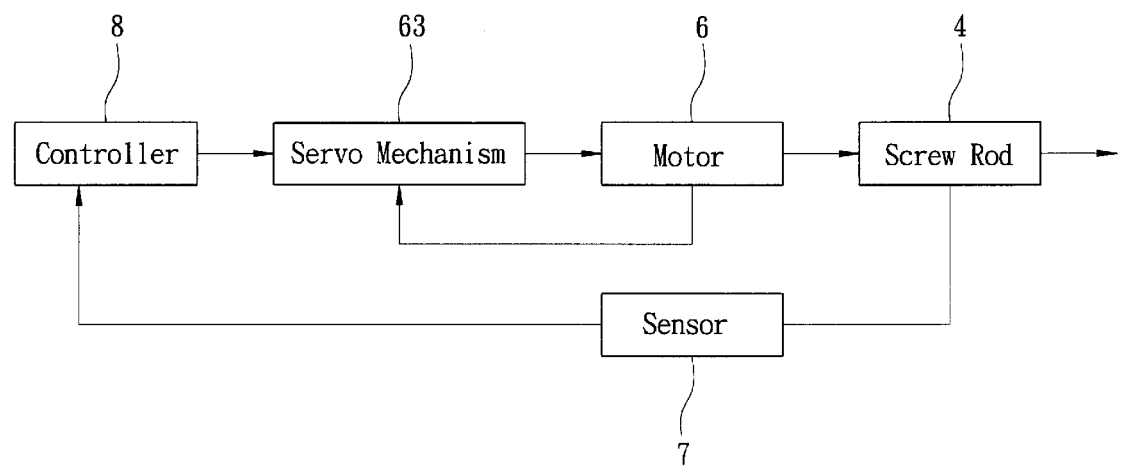
FIG. 5 is a block diagram to illustrate how the screw rod of the rubber extruder of FIG. 2 is controlled to maintain a constant advancing speed in an axial direction.

FIGS. 2 to 5 illustrate a preferred embodiment of a rubber extruder 2 according to this invention.

The rubber extruder 2 includes: a fixed cylindrical barrel 21 adapted to receive a rubber material and having a die end 211 and an opposite end 212 opposite to the die end 211; an extrusion die 25 mounted in the die end 211 of the cylindrical barrel 21; a screw rod 4 having an inner section 45 that extends co-axially through the opposite end 212 of the cylindrical barrel 21 and into the cylindrical barrel 21 and that has an abutting end 41 adapted to abut against the rubber material, and an outer section 47 that extends axially from the inner section 45 and that is disposed outwardly of the cylindrical barrel 21, the screw rod 4 being movable in an axial direction relative to the cylindrical barrel 21 so as to extrude the rubber material through the extrusion die 25; a coupling unit 3 including a threaded sleeve 33 that is sleeved rotatably on and that engages threadedly the outer section 47 of the screw rod 4; a fixed limiting member 51 in constant engagement with the screw rod 4 in such a manner that rotation of the threaded sleeve 33 results in axial movement of the screw rod 4 relative to the cylindrical barrel 21; and a driving unit 6 for rotating the threaded sleeve 33.

The rubber extruder 2 further includes a barrel support 22 that is formed with a supporting hole 23, and a bearing 24 that is mounted in the supporting hole 23. The outer section 47 of the screw rod 4 extends through and is journalled to the bearing 24 through the coupling unit 3. The driving unit 6 includes a motor 61 with an output shaft 612. The coupling unit 3 further includes a bearing sleeve 31 that is surrounded by and that contacts slidably the bearing 24 and that is sleeved securely on the threaded sleeve 33, a driven gear 32 that is sleeved securely on the bearing sleeve 31, and a driving gear 62 that is secured to the output shaft 612 and that meshes with the driven gear 32 so as to drive rotation of the threaded sleeve 33.

The outer section 47 of the screw rod 4 has a distal end 42 that is distal from the inner section 45 of the screw rod 4 and that is formed with a limiting groove 52. The limiting member 51 includes an elongated limiting bar 511 that is secured to the barrel support 52 and that extends through the limiting groove 52 in the axial direction so as to prevent the screw rod 4 from rotating upon rotation of the threaded sleeve 33, thereby permitting axial movement of the screw rod 4.

A controller 8 includes a servo mechanism 63 that is connected electrically to the driving unit 6 for controlling the output shaft 612 of the motor 61 to rotate at constant speed.

A sensor 7, which is connected electrically to the controller 8, is provided to compensate errors resulting from the precision and wearing of the screw rod 4. The sensor 7 includes a magnetic ruler 71 that is secured to the barrel support 22 and that extends in the axial direction, and a detector 72 that is secured to the distal end 42 of the screw rod 4 and that is magnetically associated with the magnetic ruler 71 so as to generate a signal that corresponds to the distance traveled by the screw rod 4 in the axial direction and that is sent to the controller 8 for calculating the traveling speed of the screw rod 4 in real-time in order to correct the advancing speed of the screw rod 4.

With the inclusion of the screw rod 4 and the controller 8 in the rubber extruder 2 of this invention, the drawbacks as encountered in the prior art can be eliminated.

With the invention thus explained, it is apparent that various modifications and variations can be made without departing from the spirit of the present invention.

We claim:

1. A rubber extruder comprising:
   a fixed cylindrical barrel adapted to receive a rubber material and having a die end and an opposite end opposite to said die end;
   an extrusion die mounted in said die end of said cylindrical barrel;
   a screw rod having an inner section that extends coaxially through said opposite end of said cylindrical barrel and into said cylindrical barrel and that has an abutting end adapted to abut against the rubber material, and an outer section that extends axially from said inner section and that is disposed outwardly of said cylindrical barrel, said screw rod being movable in an axial direction relative to said cylindrical barrel so as to extrude the rubber material through said extrusion die;
   a coupling unit including a threaded sleeve that is sleeved rotatably on and that engages threadedly said outer section of said screw rod;
   a fixed limiting member in constant engagement with said screw rod in such a manner that rotation of said threaded sleeve results in axial movement of said screw rod relative to said cylindrical barrel;
   a driving unit for rotating said threaded sleeve;
   a barrel support that is formed with a supporting hole; and
   a bearing that is mounted in said supporting hole;
   wherein said driving unit includes a motor with an output shaft, said coupling unit further including a bearing sleeve that is surrounded by and that contacts slidably said bearing and that is sleeved securely on said threaded sleeve, a driven gear that is sleeved securely on said bearing sleeve, and a driving gear that is secured to said output shaft; and
   wherein said outer section of said screw rod has a distal end that is distal from said inner section of said screw rod and that is formed with a limiting groove, said limiting member including an elongated limiting bar that is secured to said barrel support and that extends through said limiting groove in said axial direction so as to prevent said screw rod from rotating upon rotation of said threaded sleeve, thereby permitting axial movement of said screw rod.

2. The rubber extruder of claim 1, further comprising a controller including a servo mechanism that is connected electrically to said driving unit for controlling said output shaft of said motor to rotate in a constant speed.

3. The rubber extruder of claim 2, further comprising a sensor that is electrically connected to said controller, said sensor including a magnetic ruler that is secured to said barrel support and that extends in said axial direction, and a detector that is secured to said distal end of said screw rod and that is magnetically associated with said magnetic ruler so as to generate a signal that corresponds to the distance traveled by said screw rod in said axial direction and that is sent to said controller for calculating traveling speed of said screw rod in real-time.

* * * * *